(12) United States Patent
Baladi et al.

(10) Patent No.: US 12,123,359 B2
(45) Date of Patent: Oct. 22, 2024

(54) CONTROLLING A COMPRESSOR OF A TURBINE ENGINE

(71) Applicant: GE Avio S.r.l., Rivalta di Torino (IT)

(72) Inventors: Mehdi Milani Baladi, Rivalta di Torino (IT); Robert Jon McQuiston, Rivalta di Torino (IT); Aniello Esposito, Rivalta di Torino (IT); Joseph Donofrio, Rivalta di Torino (IT); Nicholas William Simone, Rivalta di Torino (IT); Simone Castellani, Rivalta di Torino (IT)

(73) Assignee: GE AVIO S.r.l., Rivalta di Torino (IT)

( * ) Notice: Subject to any disclaimer, the term of this patent is extended or adjusted under 35 U.S.C. 154(b) by 1351 days.

(21) Appl. No.: 15/978,097

(22) Filed: May 12, 2018

(65) Prior Publication Data

US 2018/0340474 A1 Nov. 29, 2018

(30) Foreign Application Priority Data

May 25, 2017 (EP) .................................... 17425052

(51) Int. Cl.
*F02C 9/18* (2006.01)
*F02C 6/08* (2006.01)
*F04D 27/02* (2006.01)

(52) U.S. Cl.
CPC ................. *F02C 9/18* (2013.01); *F02C 6/08* (2013.01); *F04D 27/0215* (2013.01); *F05D 2220/323* (2013.01); *F05D 2260/606* (2013.01); *F05D 2270/101* (2013.01); *F05D 2270/30* (2013.01)

(58) Field of Classification Search
CPC .. F02C 9/18; F04D 27/0215; F05D 2220/323; F05D 2260/606; F05D 2270/30; F05D 2270/101

See application file for complete search history.

(56) References Cited

U.S. PATENT DOCUMENTS

| | | | |
|---|---|---|---|
| 4,380,893 A | 4/1983 | Stokes et al. | |
| 6,059,522 A | 5/2000 | Gertz et al. | |
| 6,364,602 B1 | 4/2002 | Andrew et al. | |
| 6,438,484 B1 * | 8/2002 | Andrew ................. | F04D 27/02 340/966 |

(Continued)

FOREIGN PATENT DOCUMENTS

| | | |
|---|---|---|
| EP | 2620616 A2 | 1/2015 |
| EP | 2871349 A1 | 5/2015 |
| EP | 2955334 A1 | 12/2015 |

OTHER PUBLICATIONS

Gas Turbine Power Generation Professional Committee of Chinese Society for Electrical Engineering, Etc., Chongqing University Press, "Training materials for large gas-steam combined cycle power plants, PG9351 Gas Turbine/Steam Turbine Volume", Oct. 31, 2014, pp. 202-205, China.

(Continued)

*Primary Examiner* — Lorne E Meade

(74) *Attorney, Agent, or Firm* — McGarry Bair PC

(57) ABSTRACT

An aircraft can comprise an engine, an environmental control system, an engine controller, and a plurality of sensors detecting engine or aircraft parameters. Engine or aircraft operation can be updated in real time based on input from the sensors, including airflow management or operation parameters.

6 Claims, 5 Drawing Sheets

(56) References Cited

U.S. PATENT DOCUMENTS

| | | | |
|---|---|---|---|
| 6,506,010 | B1 | 1/2003 | Yeung et al. |
| 7,219,040 | B2 | 5/2007 | Renou et al. |
| 7,647,778 | B2 | 1/2010 | Zewde et al. |
| 7,827,803 | B1 | 11/2010 | Wadia et al. |
| 8,036,844 | B2 | 10/2011 | Ling et al. |
| 8,185,349 | B2 | 5/2012 | Matlis et al. |
| 8,322,145 | B2 * | 12/2012 | Snider .................... F02C 9/00 |
| | | | 60/779 |
| 8,661,832 | B2 | 3/2014 | Griffin et al. |
| 9,097,133 | B2 | 8/2015 | Dong et al. |
| 9,540,944 | B2 * | 1/2017 | Meisner ............... F04D 27/001 |
| 9,797,314 | B2 * | 10/2017 | Hillel .................. F04D 27/0261 |
| 2002/0170295 | A1 | 11/2002 | Chapman |
| 2007/0137214 | A1 | 6/2007 | Zewde et al. |
| 2015/0275769 | A1 | 10/2015 | Foutch et al. |
| 2015/0354464 | A1 | 12/2015 | Hillel et al. |
| 2016/0167792 | A1 | 6/2016 | Greenberg et al. |

OTHER PUBLICATIONS

Third Chinese Office Action re Corresponding Application No. 2018105142454, May 12, 2021, 15 pages.

\* cited by examiner

CONTROLLING A COMPRESSOR OF A TURBINE ENGINE

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Gas turbine engines for aircraft can be designed to operate with pre-selected pressure ratios. Optimizing the pressure ratio can be beneficial for the engine efficiency and output power.

BRIEF DESCRIPTION OF THE INVENTION

In one aspect, a method of real-time controlling of a compressor of a turbine engine having a controller in which is stored a compressor map including a surge line and an operating line, the difference between defines a stall margin comprises: a) during the operation of the engine, sensing in real time one or more engine parameters corresponding to aircraft horsepower extraction, environmental control system bleed, or foreign object debris door deployment; b) setting a real-time operating line for the compressor based on the sensed one or more engine parameters, which provides a real-time stall margin less than a maximum safety factor stall margin for the sensed one or more engine parameters; and c) operating the engine according to a compressor map using the real-time operating line.

In another aspect, a method of real-time controlling of a compressor of a turbine engine having a controller in which is stored a compressor map including a surge line and an operating line, the difference between defines a stall margin, comprises: during the operation of the engine, sensing in real time a demand for environmental control system bleed air, and dumping environmental control system bleed air from the compressor when the sensed demand is indicative of no demand.

In yet another aspect, an aircraft comprises an environmental control system (ECS), a turbine engine comprising a multiple stage compressor with a bleed air line fluidly coupling at least one of the multiple stages to the ECS, a dump valve fluidly coupling the bleed air line to atmosphere, an ECS sensor operably coupled to at least one of the ECS and the bleed air line and outputting an ECS signal indicative of a demand for the ECS, and a controller receiving the ECS signal and operably coupled to the dump valve and opening the dump valve when the ECS signal indicates no demand by the ECS for bleed air.

In even yet another aspect, a turbine engine comprises a compressor with multiple stages, at least one sensor providing a real time signal of an engine operating parameter, an engine controller comprising a memory in which is stored a compressor map including a surge line and an operating line, the difference between defines a stall margin. The engine controller receives as input the engine operating parameter and updates the operating line in the engine map in real time.

DESCRIPTION OF EMBODIMENTS OF THE INVENTION

Figure 1:
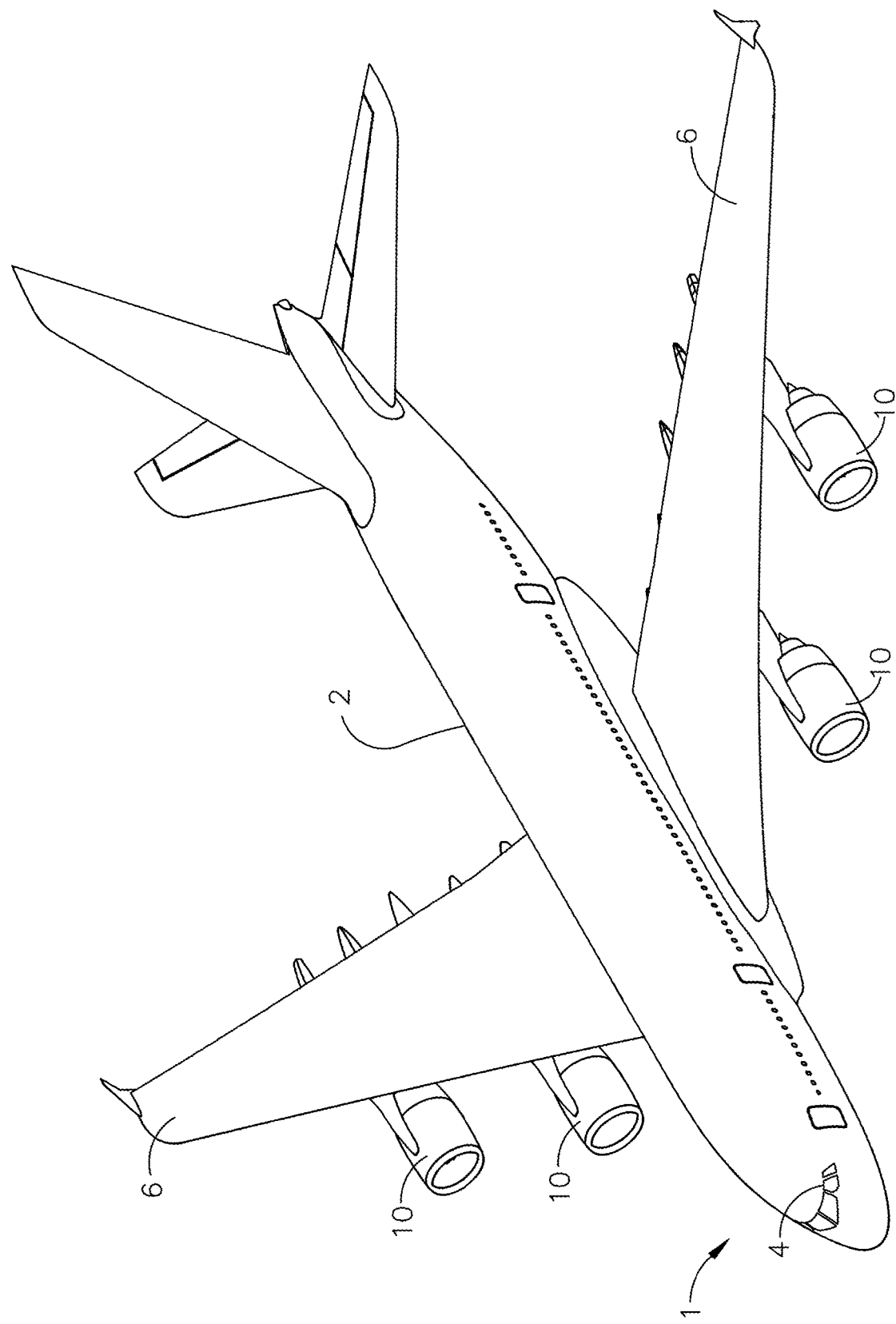
FIG. 1 is a schematic perspective diagram of an aircraft including a turbine engine.

The described embodiments of the present disclosure are directed to systems, methods, and other devices related to a stall margin of a compressor. For purposes of illustration, the present disclosure will be described with respect to an aircraft gas turbine engine. It will be understood, however, that the disclosure is not so limited and may have general applicability in non-aircraft applications, such as other land based or marine mobile applications, non-mobile industrial, military, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft 1 which can also include a fuselage 2, a cockpit 4 positioned in the fuselage 2, and wing assemblies 6 extending outward from the fuselage 2. The aircraft 1 can also include multiple engines, including turbine engines 10 which by way of non-limiting example can be turbojet, turbofan, turboprop, or turboshaft engines. While a commercial fixed wing aircraft 1 has been illustrated, it is contemplated that aspects of the disclosure described herein can be used in any type of fixed wing, rotary wing, or convertible wing aircraft such as the V22 Osprey in a non-limiting example. Further, while two turbine engines 10 have been illustrated on each of the wing assemblies 6, it will be understood that any number of turbine engines 10 including a single turbine engine 10 on the wing assemblies 6, or even a single turbine engine 10 mounted in the fuselage 2 can be included. In an example where the aircraft 1 includes a rotary wing aircraft, multiple fuselage mounted turbine engines can be included in the aircraft 1.

Figure 2:
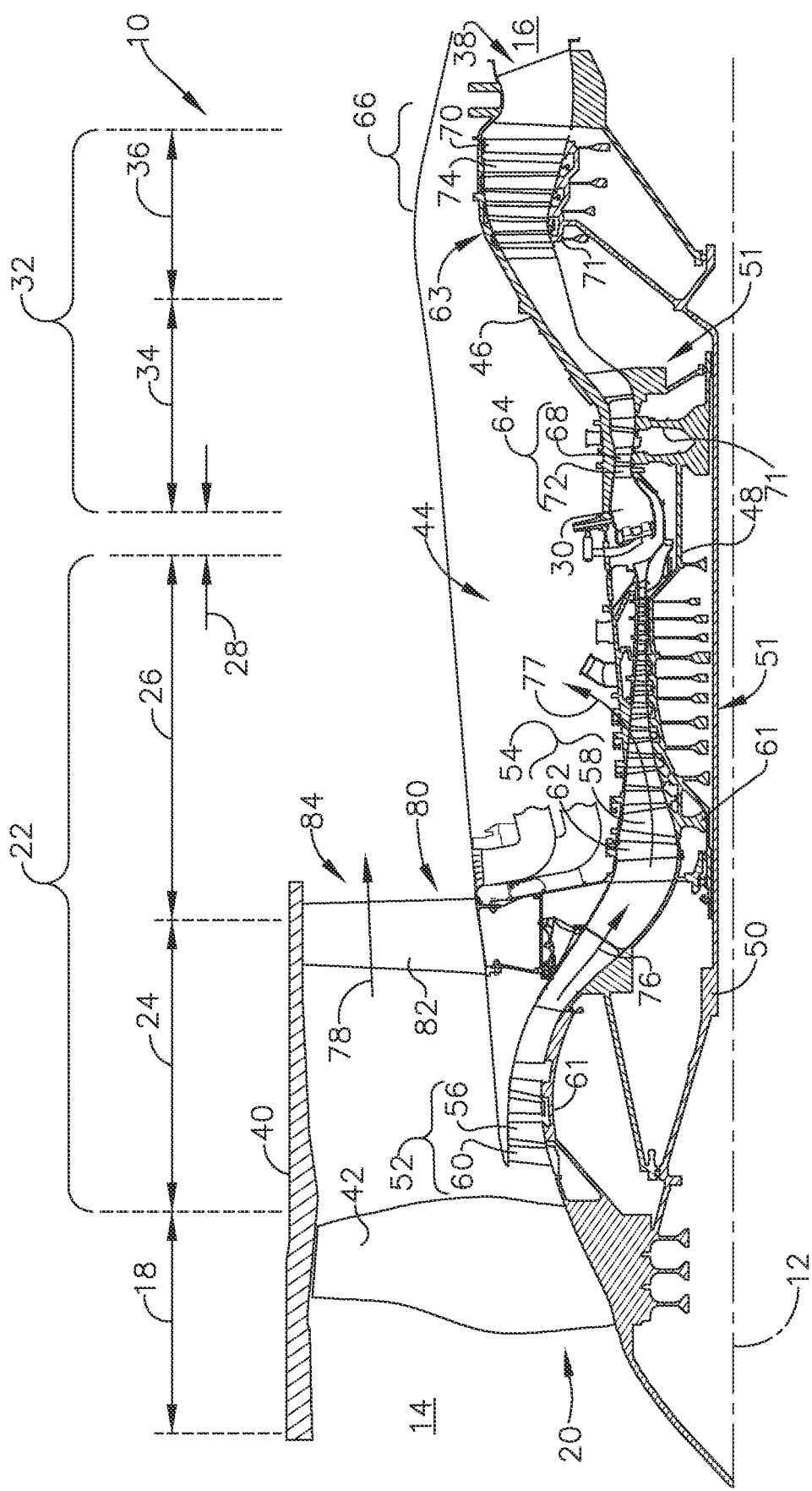
FIG. 2 is a schematic cross-sectional diagram of the turbine engine of FIG. 1 including a compressor according to various aspects described herein.

Turning to FIG. 2, the turbine engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the turbine can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft 1. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 3:
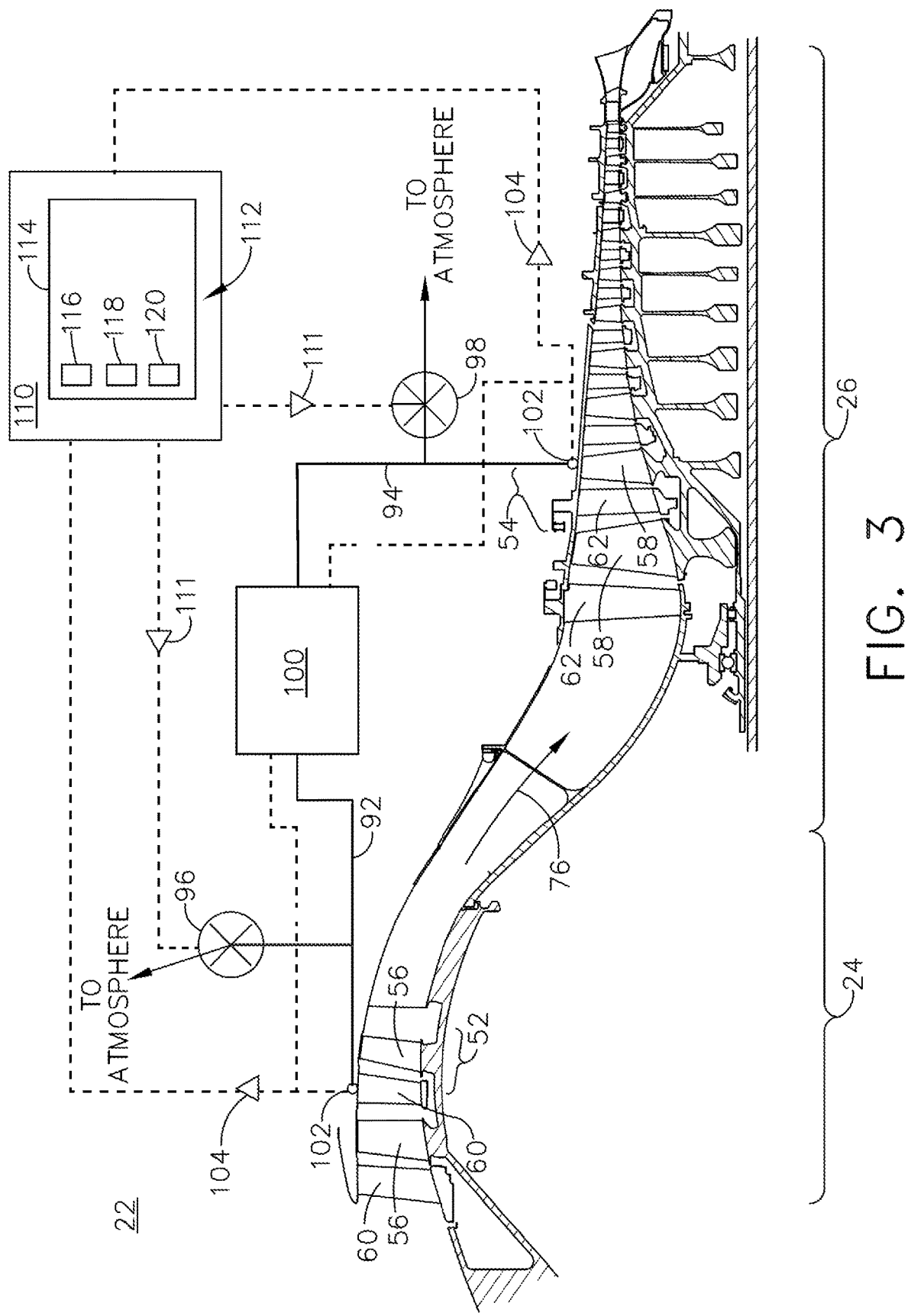
FIG. 3 is a schematic cross-sectional diagram of the compressor of FIG. 2 including an environmental control system (ECS) and controller.

Turning to FIG. 3, the compressor section 22 can include an LP bleed air line 92 fluidly connected to the stage 52 of the LP compressor 24, and an HP bleed air line 94 fluidly connected to the stage 54 of the HP compressor 26. An LP dump valve 96 can be coupled to the LP bleed air line 92, and an HP dump valve 98 can be coupled to the HP bleed air line 94 as shown, where the dump valves 96, 98 can be fluidly connected to atmosphere external to the aircraft 1 (FIG. 1). It will be understood that the stages 52, 54 to which the bleed air lines 92, 94 are connected are exemplary and can be any stages within the LP compressor 24 and HP compressor 26, respectively.

The aircraft 1 (FIG. 1) can further comprise an environmental control system (ECS) 100 and ECS sensors 102, which can be positioned anywhere within the engine 10 and are illustrated in FIG. 3 as positioned at the stages 52, 54 of the compressors 24, 26. It will be understood that the ECS 100 can manage cabin air supply as well as other factors, such as air pressurization or temperature, in non-limiting examples. The sensors 102 can sense an engine operating parameter including, but not limited to, engine horsepower, engine horsepower extraction, environmental control system bleed, foreign object debris door deployment, or a secondary engine parameter including, but not limited to, engine age, transient effects, temperature effects, minimum airspeed, altitude, attitude, engine inlet distortion, or inclement weather conditions, and it should be appreciated that the sensed parameters can also indicate a demand for the use of bleed air from the compressors 24, 26. It will be understood that at least one of the above-listed parameters may be sensed by the sensors 102, or at least four, or all of the parameters, or any desired combination, in non-limiting examples. It will further be understood that other aircraft or engine parameters which can impact operability of the aircraft 1 may also be sensed by the sensors 102.

An engine controller 110 (which can be a full authority digital engine controller, or "FADEC") can also be included in the turbine engine 10. An ECS signal 104 communicating the sensed parameter can be sent from the sensors 102 to the ECS 100 or the controller 110, and a controller signal 111 can be sent from the controller 110 to the dump valves 96, 98 or to other components (not shown) of the engine in operation.

The engine controller 110 can include a memory 112. A compressor map 114 which is used by the controller 110 to operate the engine 10 can be stored in the memory 112, and the compressor map 114 can include a surge line 116, operating line 118, and stall margin 120. As used herein, "surge line" will refer to the pressure ratio wherein the airflow through the engine 10 can break down or become unstable, causing an engine stall, and "operating line" will refer to the operating pressure ratio which can be below that of the surge line. In addition, "pressure ratio" can refer to any of the following in non-limiting examples: the ratio of air pressures taken at the inlet and outlet of the compressor section 22, the ratio of air pressures taken at the inlet and outlet of the compressors 24, 26 individually, or the ratio of air pressures taken at any two locations within the compressor section 22 as desired such as the P25 or P3 locations. The stall margin 120 can be defined as the difference between the surge line 116 and operating line 118, and it should be understood that the percent difference between the surge line 116 and operating line 118 can also be used to define the stall margin 120. Traditionally, the operating line was set based on a fixed-value, maximum safety factor stall margin, which assumed worst case operating conditions for the aircraft and which led to a corresponding large stall margin. All things being equal, the greater the stall margin, the less efficiently the engine is operating.

Figure 4:
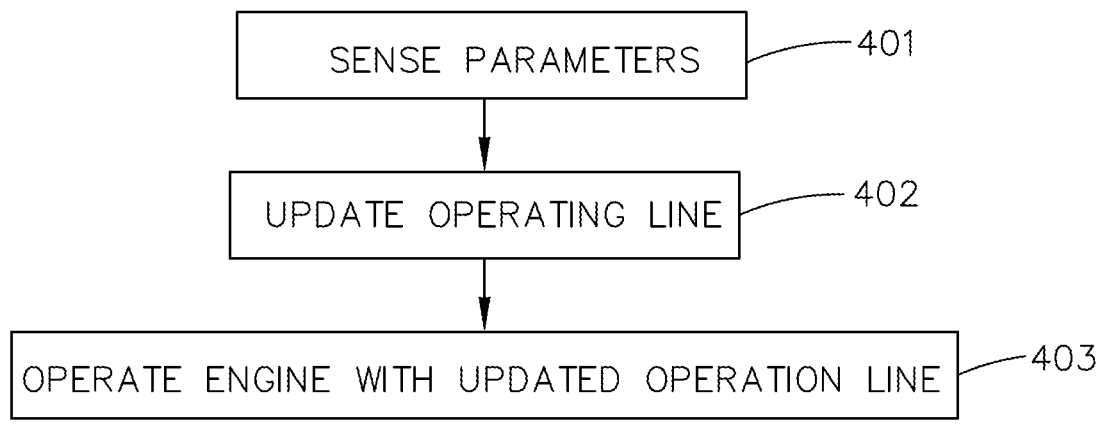
FIG. 4 is a flowchart illustrating a method of real-time controlling the compressor of FIG. 3 to operate the engine.

In operation, a method of controlling the compressors 24, 26 for operating the engine 10 is illustrated in FIG. 4. At step 401, the sensors 102 can sense the desired engine or secondary parameter during operation of the engine 10 as described above. The ECS signal 104 can be directed to the engine controller 110, where a processor within the controller 110 can receive the ECS signal 104 and update the compressor map 114 in real time. One exemplary calculation for the stall margin (SM) 120 can include the following:

$$SM = 100\% \frac{PR_s - PR_o}{PR_o}$$

where $PR_s$ is the pressure ratio at the surge line 116 and $PR_o$ is the pressure ratio at the operating line 118; it will be understood that the calculation may differ from that given here, and that the stall margin 120 can depend on pressure ratios, air temperatures, coefficients of heat transfer, and other parameters that can be sensed by the sensors 102. In this manner a new operating line 118 can be calculated by the controller 110 in real time at step 402. The engine controller 110 can operate the engine 10 according to the updated compressor map 114 at step 403. It is contemplated that the stall margin 120 based on the real-time-updated operating line 118 can be less than a maximum safety factor stall margin for the turbine engine 10, and it is further contemplated that one result of operating the engine 10 based on the updated operating line 118 can be to dump bleed air from either or both of the bleed air lines 92, 94. It will be understood that the steps outlined in FIG. 4 can be repeated during the operation of the engine 10; in non-limiting examples the repetition of steps 401, 402, 403 can occur on a predetermined schedule, at predetermined time intervals, at predetermined schedules at predetermined time intervals, or during predetermined phases of operation such as take-off, climb, cruise, descent, or landing.

Figure 5:
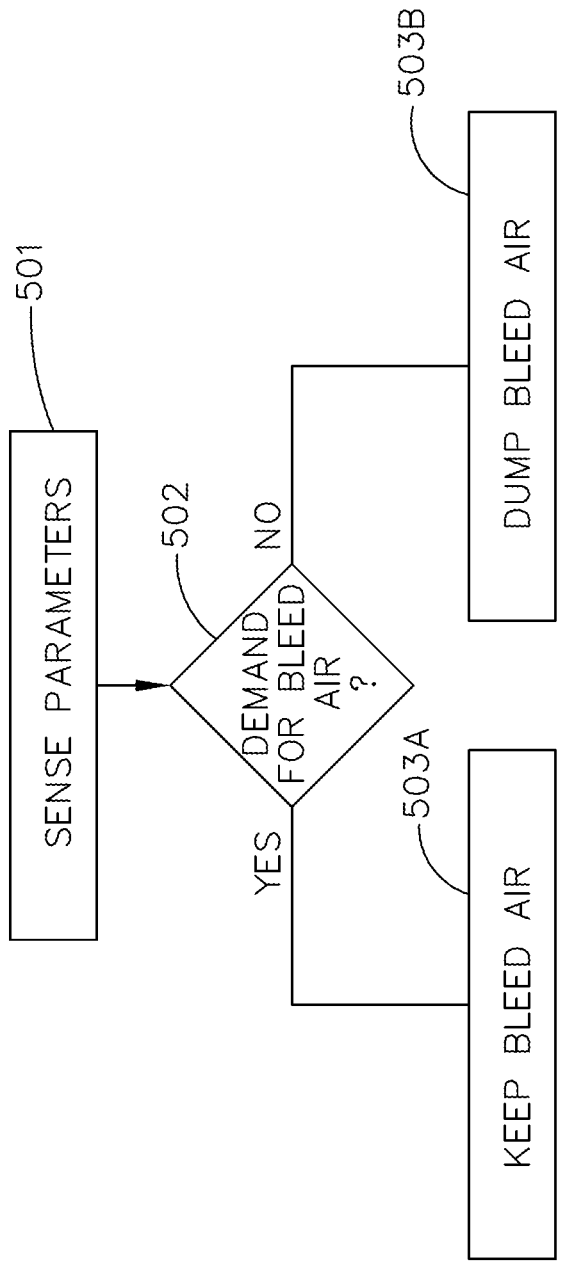
FIG. 5 is a flowchart illustrating a method of real-time controlling the compressor of FIG. 3 to manage airflows.

During normal operation of the engine 10, bleed air can be used to drive components within the engine 10 or for cooling purposes, in non-limiting examples, and a method of controlling the compressors 24, 26 for directing bleed air is illustrated in FIG. 5. At step 501, the sensors 102 can sense in real time the desired engine or secondary parameter as described above where the parameter can indicate a demand for ECS bleed air. The controller and the ECS signal 104 can be sent to the controller 110, and at step 502 the demand for bleed air can be checked. If such a demand is sensed, the controller 110 can send the controller signal 111 to the dump valves 96, 98 to be closed (or stay closed as appropriate) in step 503A to keep the air in the bleed air lines 92, 94. If no such demand for ECS bleed air is sensed by the sensors 102, the controller signal 111 can direct either or both of the dump valves 96, 98 to be opened (or stay open as appropriate) in step 503B to dump the bleed air to the external atmosphere. It should be appreciated that a lower-than-expected demand for bleed air can indicate a fault condition within the engine 10, or pose a risk to the operating line of the compressor 24, 26, and in such a case, dumping bleed air can be a way to maintain the stall margin 120. It is contemplated that the condition of "no demand" can include a bleed air demand threshold level, below which the controller 110 can determine that the bleed air should be dumped. It is further contemplated that bleed air from one location in the compressor 24, 26, can be prioritized over that from another location in the compressor 24, 26 as desired; in non-limiting examples, bleed air at the P25 location in the HP compressor 26 can be prioritized over that of P3 location at cruising altitude, or a chosen dump valve can be instructed to never open unless the ECS 100 is turned off. An additional engine parameter, such as aircraft horsepower extraction or foreign object door (FOD) deployment in non-limiting examples, can also be checked along with the demand for bleed air; it can be appreciated that the operating line 118 can be updated in real time by the combination of the additional parameter and the sensed demand for bleed air. It will be understood that the steps outlined in FIG. 5 can also be repeated during engine operation, and that such repetition can occur on a predetermined schedule or at predetermined time intervals as desired.

It is further contemplated that, based on the real-time calculation of the operating line 118 within the controller 110, a signal can be sent to the aircraft 1 to cause a change to the aircraft to maintain a positive stall margin 120. Non-limiting examples of changes to the aircraft include reduction of horsepower extraction load, change in FOD door state (for example, from 'deployed' to 'stowed'), or increase in bleed air flow (for example, from a 'nominal' to 'high' flow rate). The signal can include any parameter appropriate for a variety of aircraft types, and it can be appreciated that the capability for engine signaling features can be significantly expanded in an example where the aircraft 1 includes a remotely-piloted or autonomous aircraft as the engine controller 110 and an aircraft controller can have enhanced authority over operating features of the aircraft 1.

It can be appreciated that updating the operating line 118 and stall margin 120 in real time (FIG. 3, FIG. 4), and the selective removal of bleed air from the engine 10 (FIG. 3, FIG. 5), can provide for an optimization of engine performance and efficiency compared to that based on a traditional, maximum safety factor stall margin. The traditional stall margin based on worst-case operating conditions can have a maximized safety factor to prevent a stall condition; however, the "worst-case operating conditions" generally assumed that every contributing factor toward a stall condition would happen simultaneously. As certain contributing factors are more likely to occur at one stage of operation compared to another (for example, some factors can be likely to occur during take-off while others are more likely to occur at cruising altitude), it is possible to select a stall margin smaller than the maximum safety factor stall margin yet still providing for safe operation of the aircraft 1. The real-time-updated operating line 118 can be above that based on the maximum safety factor stall margin, leading to an optimized performance level and engine efficiency, but still remain below the surge line 116 at which point an engine stall could result. In addition, the real-time parameter sensing by the ECS sensors 102 can provide for active management of the environmental control system 100 or operation of the engine 10, including dumping the bleed air as appropriate.

It should be understood that application of the disclosed design is not limited to turbine engines with fan and booster sections, but is applicable to turboshaft engines, turboprop engines, and turbojets as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of real-time controlling of a compressor of a turbine engine having a controller in which is stored a compressor map including a surge line and an operating line, wherein a difference between the surge line and the operating line defines a stall margin, the method comprising:
    a) during the operation of the turbine engine, sensing, via at least one sensor, in real time at least two engine parameters corresponding to aircraft horsepower extraction, environmental control system bleed, or foreign object debris door deployment for the turbine engine;
    b) providing the sensed at least two engine parameters from the at least one sensor to the controller;
    c) setting, via the controller, a real-time operating line for the compressor based on the sensed at least two engine parameters, which provides a real-time stall margin less than a maximum safety factor stall margin for the sensed at least two engine parameters;
    d) operating, via the controller, the turbine engine according to a compressor map using the real-time operating line;
    e) providing a controller signal, via the controller, to at least one dump valve based on the sensed at least two engine parameters; and
    f) dumping bleed air from the compressor, by the at least one dump valve, when the sensed at least two engine parameters for the environmental control system bleed is below a predetermined amount to control an amount of bleed air flowing into an environmental control system.

2. The method of claim 1 further comprising sensing, via the at least one sensor, each of aircraft horsepower extraction, environmental control system bleed, or foreign object debris door deployment for the turbine engine.

3. A method of real-time controlling of a compressor of a turbine engine having a controller in which is stored a compressor map including a surge line and an operating line, wherein a difference between the surge line and the operating line defines a stall margin, the method comprising:
    a) during the operation of the engine, sensing, via at least one sensor, in real time one or more engine parameters corresponding to aircraft horsepower extraction, environmental control system bleed, or foreign object debris door deployment;
    b) during the operation of the engine, sensing, via the at least one sensor, in real time one or more secondary parameters corresponding to engine age, transient effects, temperature effects, minimum airspeed, altitude, aircraft attitude, or engine inlet distortion;
    c) providing the sensed one or more engine parameters and the sensed one or more secondary parameters to the controller;
    d) setting, via the controller, a real-time operating line for the compressor based on the sensed one or more engine parameters and the sensed one or more secondary parameters, which provides a real-time stall margin less than a maximum safety factor stall margin for the sensed one or more engine parameters and the sensed one or more secondary parameters;
    e) operating, via the controller, the engine according to a compressor map using the real-time operating line;
    f) providing a controller signal, via the controller, to at least one dump valve based on the sensed one or more engine parameters and the sensed one or more secondary parameters; and
    g) dumping bleed air from the compressor, by the at least one dump valve, when the sensed one or more engine parameters for the environmental control system bleed is below a predetermined amount to control an amount of bleed air flowing into an environmental control system.

4. A method of real-time controlling of a compressor of a turbine engine having a controller in which is stored a compressor map including a surge line and an operating line, wherein a difference between the surge line and the operating line defines a stall margin, the method comprising:
    during the operation of the engine, sensing, with at least one sensor communicatively coupled to the controller, in real time a demand for environmental control system bleed air for an environmental control system;
    further sensing, via the at least one sensor, in real time an engine parameter other than the demand for environmental control system bleed air, wherein the sensed engine parameter comprises at least one of: horsepower, foreign object door deployment, engine age, transient effects, temperature effects, minimum airspeed, altitude, attitude, inlet distortion, or inclement weather conditions;

providing the sensed engine parameter to the controller;

using the sensed engine parameter in combination with the demand for environmental control system bleed air, via the controller, to set a real-time operating line;

providing, via the controller, a controller signal to a dump valve based on the sensed demand;

controlling, by the controller, the dumping of the environmental control system bleed air to maintain the real-time operating line below the surge line; and dumping environmental control system bleed air from the compressor to atmosphere, in response to the controller signal by the dump valve, when the sensed demand is indicative of no demand in order to control an amount of environmental control system bleed air flowing into the environmental control system.

5. A turbine engine comprising:

a compressor with multiple stages;

at least one sensor providing a real time signal of an engine operating parameter indicative of a demand for environmental control system bleed air;

the engine operating parameter further includes at least one of:
 a) engine horsepower,
 b) aircraft horsepower extraction,
 c) foreign object debris door deployment,
 d) engine age,
 e) transient effects,
 f) temperature effects,
 g) minimum airspeed,
 h) altitude,
 i) attitude,
 j) engine inlet distortion, or
 k) inclement weather conditions;

an engine controller comprising a memory in which is stored a compressor map including a surge line and an operating line, wherein a difference between the surge line and the operating line defines a stall margin, and wherein the engine controller receives as input the engine operating parameter and updates the operating line in the compressor map in real time, the engine controller being communicatively coupled to the at least one sensor; and a dump valve communicatively coupled to the engine controller;

wherein the engine controller is configured to provide a control signal to the dump valve based on the sensed engine operating parameter such that the dump valve is configured to dump bleed air from the compressor when the demand for environmental control system bleed air is below a predetermined amount in order to control an amount of bleed air that flows into an environmental control system.

6. The turbine engine of claim 5 wherein the engine operating parameter comprises at least two of the engine operating parameters a)-k).

* * * * *